(12) United States Patent
Wyatt et al.

(10) Patent No.: US 11,604,575 B2
(45) Date of Patent: Mar. 14, 2023

(54) SYSTEMS AND METHODS FOR MANAGING CONFIGURATIONS OF MULTIPLE DISPLAYS OF A VEHICLE

(71) Applicant: Honeywell International Inc., Morris Plains, NJ (US)

(72) Inventors: Ivan S. Wyatt, Scottsdale, AZ (US); Katarina Alexis Morowsky, Phoenix, AZ (US); Aaron Gannon, Anthem, AZ (US); Christopher Heine, Mesa, AZ (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/701,769

(22) Filed: Dec. 3, 2019

(65) Prior Publication Data

US 2020/0192560 A1    Jun. 18, 2020

Related U.S. Application Data

(60) Provisional application No. 62/779,990, filed on Dec. 14, 2018.

(51) Int. Cl.
*G06F 3/04847* (2022.01)
*G06F 3/0482* (2013.01)
*H04L 41/22* (2022.01)

(52) U.S. Cl.
CPC ........ *G06F 3/04847* (2013.01); *G06F 3/0482* (2013.01); *H04L 41/22* (2013.01)

(58) Field of Classification Search
CPC ..... G06F 3/04847; G06F 3/0482; H04L 41/22
See application file for complete search history.

(56) References Cited

U.S. PATENT DOCUMENTS

| 6,112,141 A | 8/2000 | Briffe et al. |
| 7,191,406 B1 | 3/2007 | Barber et al. |
| (Continued) | | |

FOREIGN PATENT DOCUMENTS

| EP | 3223210 A1 | 9/2017 |
| WO | 2014023989 A1 | 2/2014 |

OTHER PUBLICATIONS

How do I add Checklists?; Oct. 30, 2018; aloft.ai; pp. 1-9.*

(Continued)

*Primary Examiner* — Andrew R Dyer
(74) *Attorney, Agent, or Firm* — Bookoff McAndrews PLLC

(57) ABSTRACT

Disclosed are methods, systems, and non-transitory computer-readable medium for managing configurations of multiple vehicle displays. For instance, a method may include: obtaining a configurable file for an electronic checklist; generating a graphical user interface (GUI) based on the configurable file; displaying the GUI on one of the multiple vehicle displays; receiving a user input on the GUI; and performing a window configuration setting process based on the user input. The method may also include: in response to the user input being a first user input type in a region associated with a context menu indicator: obtaining a window configuration function and a phase of flight variable; generating a context menu based on the window configuration function and the POF variable; and displaying the context menu on the GUI.

20 Claims, 5 Drawing Sheets

(56) References Cited

U.S. PATENT DOCUMENTS

| | | | |
|---|---|---|---|
| 8,484,576 B2 | 7/2013 | Berson et al. | |
| 9,134,891 B1 | 9/2015 | Schultz et al. | |
| 9,432,611 B1* | 8/2016 | Nelson | H04L 67/12 |
| 9,921,714 B1* | 3/2018 | Shapiro | G06F 3/04817 |
| 9,927,941 B2* | 3/2018 | Steimle | G16H 10/40 |
| 10,761,676 B1* | 9/2020 | Gilbert | B64D 43/00 |
| 11,460,993 B2* | 10/2022 | Ouellette | G08G 5/0052 |
| 2002/0165647 A1* | 11/2002 | Glenn | G06F 9/451 |
| | | | 701/3 |
| 2005/0007386 A1* | 1/2005 | Berson | G06T 11/00 |
| | | | 345/633 |
| 2008/0313006 A1* | 12/2008 | Witter | G01F 13/006 |
| | | | 705/7.17 |
| 2012/0287040 A1* | 11/2012 | Moore | G06F 3/012 |
| | | | 345/157 |
| 2015/0120090 A1* | 4/2015 | Wischmeyer | G01C 1/00 |
| | | | 701/3 |
| 2015/0334291 A1* | 11/2015 | Cho | G06F 3/04845 |
| | | | 348/222.1 |
| 2016/0216849 A1* | 7/2016 | Kawalkar | G06F 3/04895 |
| 2017/0275017 A1 | 9/2017 | Slocum et al. | |
| 2017/0275018 A1* | 9/2017 | Narra | B64D 45/00 |
| 2018/0292953 A1 | 10/2018 | Pandya et al. | |
| 2021/0188462 A1* | 6/2021 | Ouellette | G07C 5/0825 |

OTHER PUBLICATIONS

Extended European Search Report dated Apr. 15, 2020, in counterpad European Patent Application No. 19215851.7 (9 pages, in English).
Communication pursuant to Article 94(3) EPC dated Dec. 20, 2021 in European Application No. 19 215 851.7 (7 pages).

* cited by examiner

SYSTEMS AND METHODS FOR MANAGING CONFIGURATIONS OF MULTIPLE DISPLAYS OF A VEHICLE

CROSS-REFERENCE TO RELATED APPLICATION(S)

This application claims the benefit of priority to U.S. Provisional Application No. 62/779,990, filed Dec. 14, 2018, which is incorporated herein by reference in its entirety.

TECHNICAL FIELD

Various embodiments of the present disclosure relate generally to systems and methods for managing configurations of multiple displays of vehicles and, more particularly, to systems and methods for managing configurations of multiple vehicle displays using a graphic user interface (GUI).

BACKGROUND

Modern vehicles (e.g., aircraft) may segment multiple displays into windows of predetermined size and information content suitable for a particular task. Specifically, managing windows may be a means of managing information. Managing information may be one of the most important and difficult tasks that users of vehicles (e.g., flight crews) encounter. The windows may be thought of as "buckets" to hold and organize information. Therefore, this windowing scheme may provide substantial flexibility and versatility; however, it also may add additional cognitive and physical workload on the user to manage the windows.

Furthermore, while some predetermined window management schemes exist in some aircraft, The predetermined window management schemes may be nested in menu layering. For instance, the user may need to make five to ten, or even more inputs to traverse menu(s) or link(s) to fully reconfigure all or some of the windows or to finally arrive at the predetermined window management schemes display. Therefore, the user may be inefficient in traversing the menu(s) or link(s) and be inefficient in making the changes to reconfigure all or some of the windows.

Moreover, the traversal of menu(s) or link(s) may require the user to divert from checklist items to reconfigure all or some of the windows, therefore reducing efficiency and/or increasing the time to complete checklist items.

The present disclosure is directed to overcoming one or more of these above-referenced challenges.

SUMMARY OF THE DISCLOSURE

According to certain aspects of the disclosure, systems and methods are disclosed for systems and methods for managing configurations of multiple vehicle displays.

For instance, a method may include obtaining a configurable file for an electronic checklist; generating a graphical user interface (GUI) based on the configurable file; displaying the GUI on one of the multiple vehicle displays; receiving a user input on the GUI; and performing a window configuration setting process based on the user input.

A system may include a memory storing instructions; and a processor executing the instructions to perform a process. The process may include obtaining a configurable file for an electronic checklist; generating a graphical user interface (GUI) based on the configurable file; displaying the GUI on one of the multiple vehicle displays; receiving a user input on the GUI; and performing a window configuration setting process based on the user input.

A non-transitory computer-readable medium may store instructions that, when executed by a processor, cause the processor to perform a method. The method may include: obtaining a configurable file for an electronic checklist; generating a graphical user interface (GUI) based on the configurable file; displaying the GUI on one of the multiple vehicle displays; receiving a user input on the GUI; and performing a window configuration setting process based on the user input.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to systems and methods for managing configurations of multiple vehicle displays.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, relative terms, such as, for example, "about," "substantially," "generally," and "approximately" are used to indicate a possible variation of ±10% in a stated value. The term "exemplary" is used in the sense of "example" rather than "ideal." As used herein, the singular forms "a," "an," and "the" include plural reference unless the context dictates otherwise.

While this disclosure describes the systems and methods with reference to aircraft, it should be appreciated that the present systems and methods are applicable to managing display screens of vehicles, including those of drones, automobiles, ships, or any other autonomous and/or Internet-connected vehicle.

In general, the present disclosure is directed to systems and methods for managing configurations of multiple displays. Specifically, as discussed more fully below, the present disclosure may enable users of vehicles to quickly and easily manage window layout. Moreover, the users may be able to manage window layout quickly and easily in the normal course of cockpit activities (e.g., while performing checklist item tasks).

For instance, in one aspect of the disclosure, the user may manage window layout while interacting with checklists to set up set up an appropriate phase of flight (POF) window configuration without disrupting checklist item tasks. Specifically, the user may input a first user input to prompt a context menu that may display one or more relevant POF window configurations. Therefore, the user may avoid transversal of menu(s) or link(s) to reconfigure all or some of the windows, and thereby efficiently reconfigure the windows without diverting from the checklist item tasks.

Figure 1:
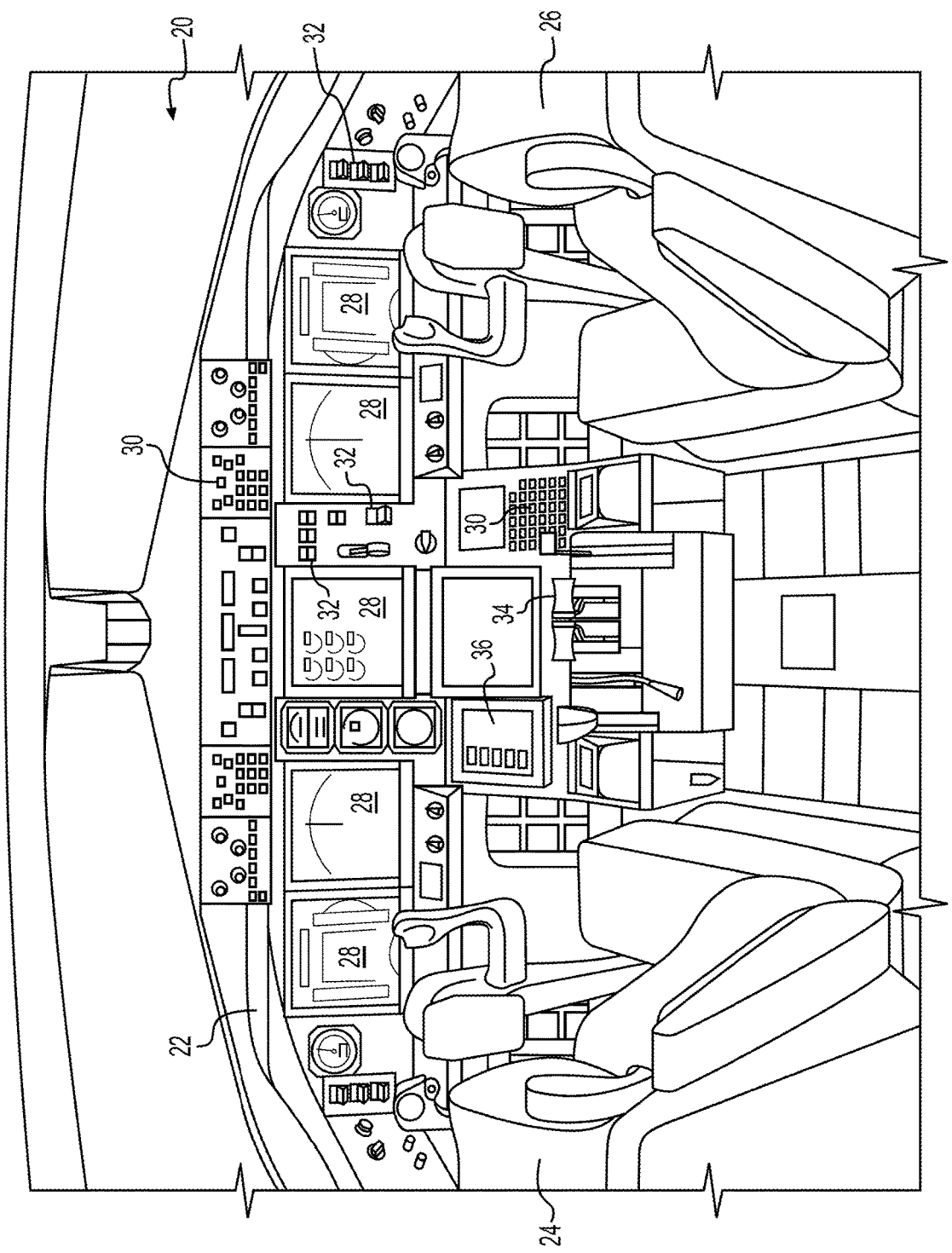
FIG. 1 depicts an exemplary system environment, according to one or more embodiments.

As shown in FIG. 1, an exemplary system environment is depicted, according to one or more embodiments. Specifically, FIG. 1 is a fragmentary perspective view illustrating the inside of an exemplary aircraft cockpit 20. Although the context of the following discussion is with respect to GUIs of touch screen displays used in aircraft, it should be understood that the teachings herein pertain to touch screen displays used in any type of vehicle including, but not limited to, land based vehicles such as automobiles and trains as well as watercraft and spacecraft. Additionally, the teachings herein are not limited to vehicle applications. Rather, the teachings herein may also be used together with touch screen displays that are employed in stationary applications such as information kiosks and automatic teller machines as well as with touch screen displays that are hand held or otherwise not mounted to a surface.

Aircraft cockpit 20 includes an instrument panel 22 positioned to be accessible from a pilot seat 24 and a copilot seat 26. Instrument panel 22 includes various front displays 28 and various control features such as buttons 30, switches 32, and throttle controls 34. Also mounted on instrument panel 22 is a control touch screen display 36. Moreover, the front displays 28 may also be a touch screen displays.

Figure 2:
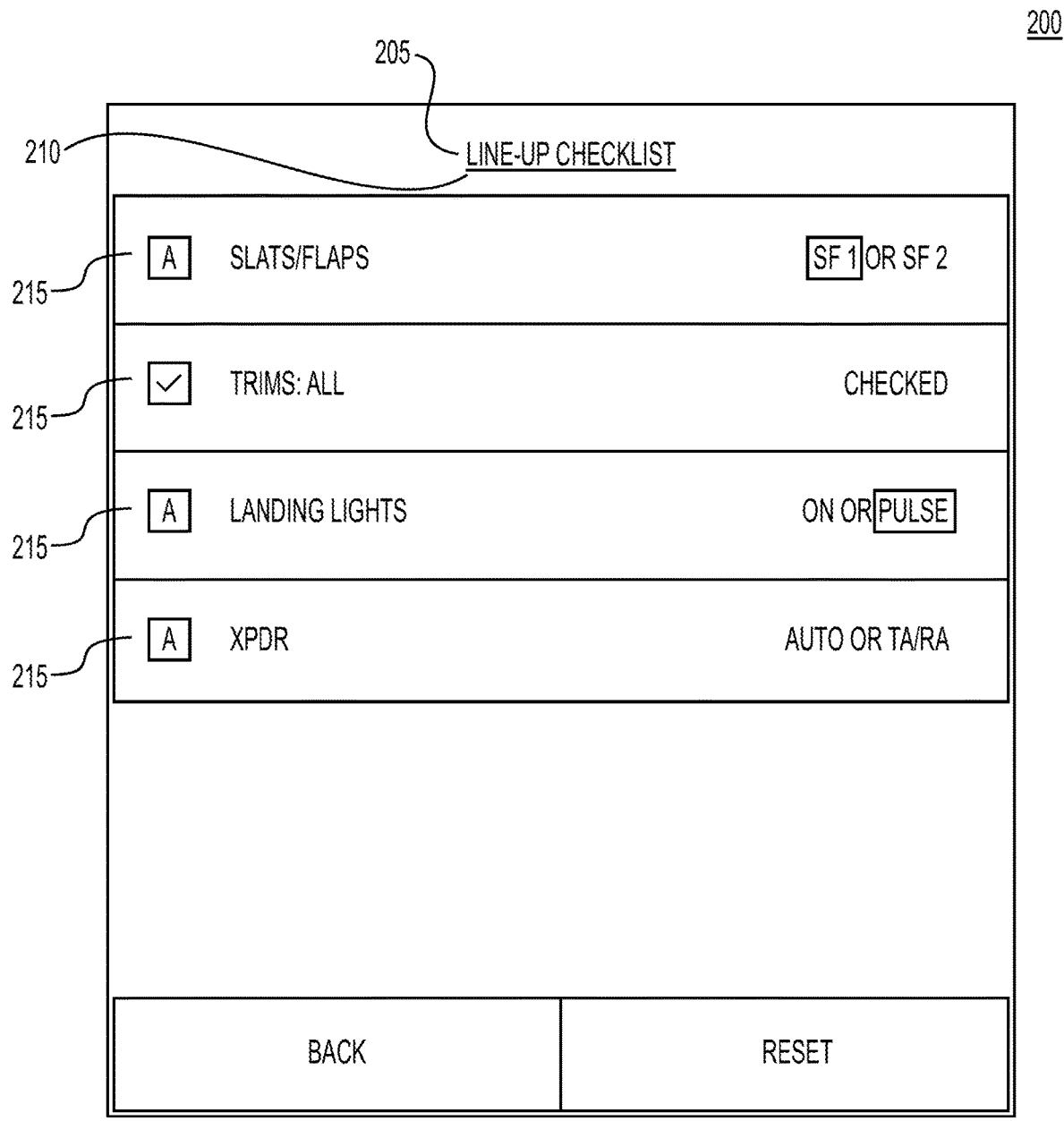
FIG. 2 depicts a GUI on a touch screen for managing configurations of multiple vehicle displays, according to one or more embodiments.
Figure 3:
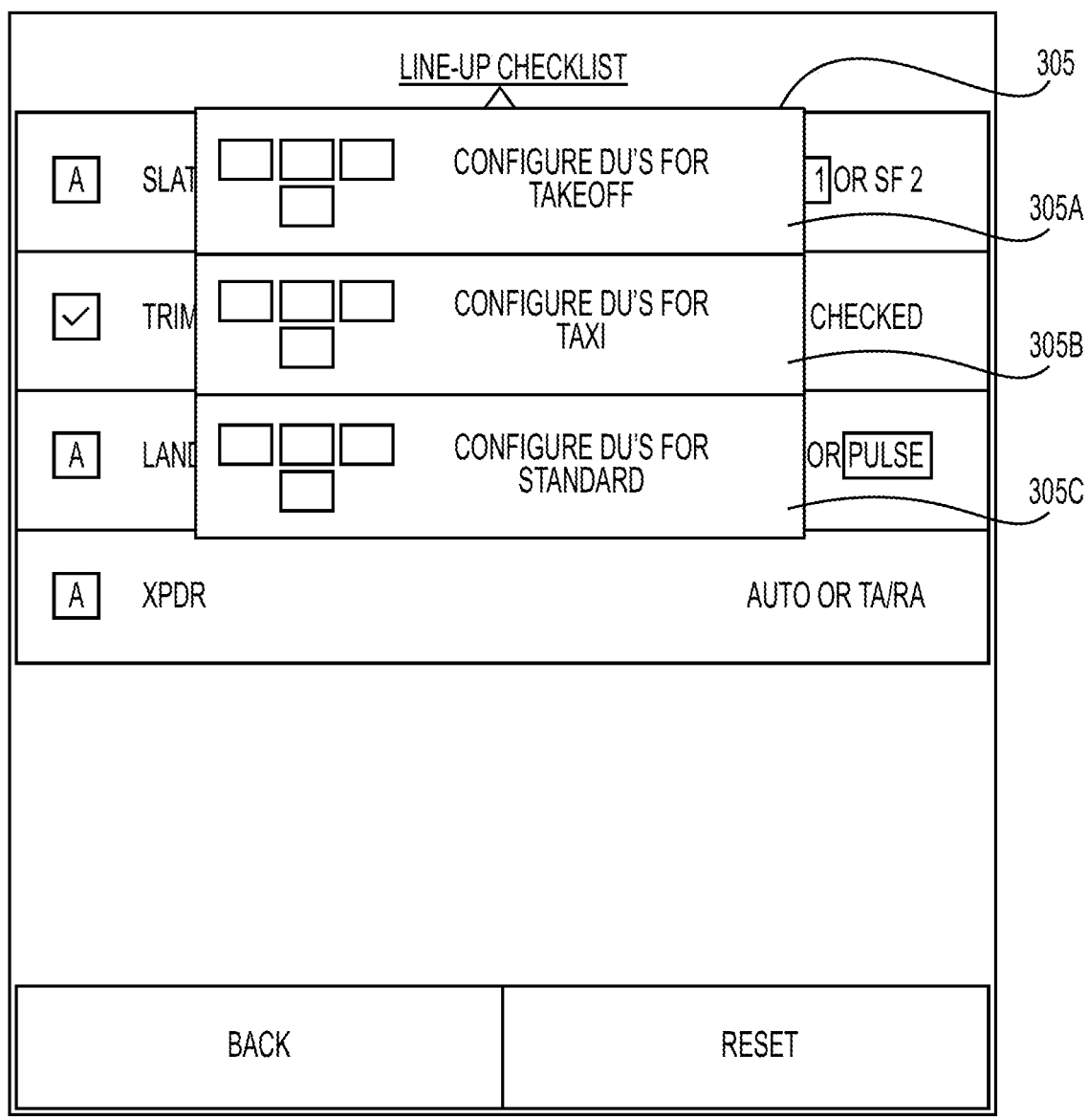
FIG. 3 depicts a GUI on a touch screen for managing configurations of multiple vehicle displays, according to one or more embodiments.

One of the front displays 28 or the control touch screen display 36 may be configured to operate as a checklist manager (hereinafter referred to as "touch screen"). Specifically, a processor may execute a checklist control program (comprised of instructions executable by the processor) that causes the touch screen to display a checklist control display. For instance, the checklist control display may include one or more GUIs as disclosed herein (or variations thereof), such as GUI 200 and GUI 300 (as depicted in FIGS. 2 and 3, respectively). The GUI 200 may depict an electronic checklist on the touch screen. The GUI 300 may depict the electronic checklist on the touch screen in response to the first user input.

The processor may cause the touch screen to display the checklist control display by generating images and transmitting the images to the touch screen to be displayed. Alternatively, the processor may generate instructions and information and transmit the instructions and information to a graphics processing unit (GPU). The GPU may generate the images to be displayed on the touch screen. The checklist control program may be stored in a memory. The memory may be connected to the processor so that the processor may receive stored instructions or data, and the processor may process the instructions, stored data, and received information in accordance with the checklist control program. The memory and the processor may be connected to the touch screen either directly or indirectly. Collectively the memory, the processor, and the touch screen may be referred to as a "system."

For instance, the checklist control program may control the configuration of the front displays 28 and/or the control touch screen display 36 (collectively "configured state"). The checklist control program may store the configured state in the memory. The checklist control program may control the configuration of the front displays 28 and/or the control touch screen display 36 based on user inputs to the system. Specifically, the checklist control program may display the checklist control display to depict the electronic checklist, and receive user inputs to view and/or change to the configured state of the front displays 28 and/or the control touch screen display 36.

User inputs may be the first user input, or any other type of user input described herein. Generally, the user input may be a touch interaction with the touch screen (e.g., capacitive, resistive, and/or optical sensing), a user input on a keyboard, a mouse, a scroll wheel, or any other system-defined manner of selecting and interacting with the system. The processor may receive the user inputs and perform specific actions based on the user inputs, as discussed herein.

In one aspect of the disclosure, user interactions with the front displays 28 and/or touch screen display 36 may include a first user input. In one embodiment, the first user input may be a short touch on a region associated with an icon or a long touch on the region associated with an icon. The short touch may be any touch on the region for more than a minimum amount up to a configurable threshold period of time (e.g., less than one second). The long touch may be any touch for more than a configurable period of time (e.g., more than two seconds) up to a maximum period of time. The period of time for the short touch and the long touch may be the same or the period of time for the short touch may be less than the period of time for the long touch. Other user inputs may be one of or a combination of: a tap (e.g., a touch on a region of an icon for less than a minimum period of time), a swipe (e.g., a touch on a region of an icon that moves/drags/remains in contact with the touch screen interface from a starting position in the region to an ending position in the region or out of the region by a threshold distance), or multi-finger inputs (e.g., two or more discernable touch points in a region). Generally, in another aspect of the disclosure, the first user input may be one of: a short touch, a long touch, a tap, a swipe in a direction, or a multi-finger input (referred to as a "first input type").

FIG. 2 depicts a GUI 200 on a touch screen for managing configurations of multiple vehicle displays on a vehicle, according to one or more embodiments. For example, GUI 200 may be displayed on front displays 28 and/or touch screen display 36 of an instrument panel 22 of an aircraft cockpit 20. In one embodiment, GUI 200 may display any type of vehicle checklist control display, such as an aviation checklist, such as line-up checklist 205, as depicted.

Generally, the checklist control display of GUI 200 may include any type of electronic checklist. The electronic checklist may include a configurable file to generate and display checklists. The configurable file may store the checklists in association with all checklist items associated with the checklists and various indications, values, information, etc. for the checklist items. Moreover, the electronic checklist may also include an active mission file. The active mission file may store all user or system inputs in association with the checklists and the checklist items. The processor may obtain the configurable file and the active mission file to generate the checklist control display for the currently active checklist.

A checklist of the electronic checklist may include a checklist title 205, an underline bar 210, and/or one or more checklist items 215. The checklist may also include a back button and/or a reset button.

The checklist title 205 of the currently displayed checklist of the electronic checklist may depict a text-string. The text-string may be composed of alphanumeric symbols that convey information to the users about the phase of flight and/or emergency situations associated with the checklist. The checklist title 205 may be located in a header of the GUI, and it may remain in the header of the GUI even if the window of the GUI scrolls down or up.

The underline bar 210 may indicate that the associated icon (e.g., the checklist title 205 of the currently displayed checklist of the electronic checklist) has a context menu accessible by the first user input. Generally, the underline bar 210 (or context menu indicator) may be associated (and displayed) with any graphical element (e.g., icon, text, task, header, title, etc.) to indicate that the graphical element has a context menu accessible by the first user input. The context menu and the first user input are discussed below with respect to FIG. 3.

The one or more checklist items 215 may be items with information about tasks associated with the currently displayed checklist of the electronic checklist. The one or more checklist items 215 may be selected or interacted with based on user inputs. For instance, the user may indicate that some of the checklist items are complete by touch inputs to regions of the touch screen associated with the checklist items 215. The checklist control program may determine the currently active checklist is accomplished/finished by a user input. For instance, by a user input indicating last check list item of the checklist items 215 is finished/accomplished (either all items are finished/accomplished or all required items if some are optional are finished/accomplished) or by a user input indicating to move to a next checklist of the electronic checklist.

The back button and/or the reset button may control the electronic checklist functionality. Specifically, the reset button may be selected by the user by a user input, and the touch screen may receive that user input. The touch screen may transmit the user input to the processor, and the processor may refresh and/or set the currently active checklist to default settings. The back button may be selected by the user by a user input, and the touch screen may receive that user input. The touch screen may transmit the user input to the processor, and the processor may undo the most recent user interface associated with the checklist and/or undo a change in window configuration, and/or the processor may move to a different checklist of the electronic checklist.

FIG. 3 depicts a GUI on a touch screen for managing configurations of multiple vehicle displays on a vehicle, according to one or more embodiments. Generally, any item having the underline bar 210 (e.g., any checklist title 205 of the checklists of the electronic checklist) may be interacted with as discussed below with respect checklist title 205. Specifically, FIG. 3 may depict a GUI as a part of a window configuration setting process. The window configuration setting process may include: receiving a user input; determining whether the user input is in a region associated with a graphical element that is associated with a context menu; and in response to determining the user input is in a region associated with the graphical element, displaying a context menu ("menu") for selecting a window configuration of the displays of the vehicle. After displaying the menu, the window configuration setting process may receive another user input to select a window configuration of the displays of the vehicle. For instance, the window configuration setting process may determine whether the another user input is in a region associated with one of one or more window configuration options; and if so, configure the displays of the vehicle in accordance with the one of one or more window configuration options.

FIG. 3 depicts an exemplary GUI 300 of the checklist manager, for instance as in FIG. 2, but after/in response to receiving a first user input. Therefore, GUI 300 may be the same as the GUI 200, however GUI 300 may also include a menu 305. The menu 305 may be the context menu discussed above associated with the underline bar 230. For instance, each of the checklist titles 205 of the electronic checklist may indicate the presence or availability of a different type of context menu. For instance, as depicted in FIG. 3, the line-up checklist may not have the same context menu as a context menu associated with a taxi checklist. Alternatively, the same context menu may be displayed by the checklist control program in response to the first user input on a checklist title 205.

For instance, as depicted in FIG. 3, the menu 305 may depict the context menu for the line-up checklist. The menu 305 may display one or more different window configuration options (or a plurality of window configuration options) and provide the user with an interface to make a selection of one or more window configuration options. For instance, the menu 305 may include a first window configuration 305A, a second window configuration 305B, and/or a third window configuration 305C. To close the menu 305, the user may input a user input anywhere else on the screen. The menu 305 may be displayed below the checklist title 205 and/or in a same horizontal (from a left or right edge of the GUI) section or general area of the GUI as the checklist title 205 associated with the menu 305. Furthermore, the menu 305 may have an indicator carrot that extends from the menu 305 to the checklist title 205 associated with the menu 305.

In general, first window configuration 305A, second window configuration 305B, third window configuration 305C, and any other window configurations may be displayed in a sequence corresponding to either the phase of flight, checklist sequence, a priority sequence, a frequency-of-use sequence, or any other desired sequence. For example, in one embodiment, the first window configuration 305A may correspond to a window configuration for the present checklist and/or current phase of flight. The second window configuration 305B may correspond to a window configuration for the most recent checklist and/or most recent phase of flight, or a window configuration for a next checklist and/or next phase of flight. The third window configuration 305C may correspond to a default or standard window configuration for any checklist and/or phase of flight (e.g., a "generic" window configuration).

The first window configuration 305A and the second window configuration 305B may include information (e.g., text) that indicates what type of window configuration will be implemented. For instance, the information may include a text-string that states the window configuration option will configure the display units (DUs) for a POF name or checklist name. For instance, the POF name may be one of: (1) Cockpit Preparation; (2) Before Start; (3) After start; (4) Line-Up; (5) Takeoff; (6) After Takeoff; (7) Approach; (8) Before Landing; (9) At Ramp; and/or (10) Securing The Aircraft. For instance, the checklist name may be one of: (1) Cockpit Preparation Checklist; (2) Before Start Checklist; (3) After start Checklist; (4) Line-Up Checklist; (5) Takeoff Checklist; (6) After Takeoff Checklist; (7) Approach Checklist; (8) Before Landing Checklist; (9) At Ramp Checklist; and/or (10) Securing The Aircraft Checklist. The above list of checklists names or POF names may correspond to original equipment manufacturer (OEM) definitions, which may be aligned with crew information and task organization, and do not necessarily align with any International Civil Aviation Organization's (ICAO) definitions.

The third window configuration 305C may include information (e.g., text) that indicates what type of window configuration will be implemented. For instance, the information may include a text-string that states the window configuration option will configure the display units (DUs) for Standard or Default.

Alternatively, or in addition, the menu 305 may include more than three window configuration options. For instance, the menu 305 may include the three discussed above along with a link to all pre-defined window configuration or at the top of a list of all the pre-defined window configurations. Furthermore, the menu 305 may include user defined window configurations that may define the configuration of the windows and associate the configuration with a user-defined name, which may be displayed with the user defined window configuration option. Moreover, the checklist control program may store the last window configuration and also provide a last window configuration option to the menu 305, so that the user may quickly recover from an inadvertent selection and activation.

Furthermore, the electronic checklist may also include a window configuration file and/or window configuration rules (or window configuration function). The window configuration file and/or the window configuration rules may store all of the pre-defined window configurations and/or user-defined window configurations for the front displays 28 and/or the control touch screen display 36. For instance, a taxi window configuration may control one or more of the front displays to display one or more a map of a current airport and an aircraft's location the map, a map of the runways and the aircraft's location the map, traffic for the airport (on ground and/or in the air), and/or weather for the airport.

The window configuration function may associate a POF variable of the system to the currently active checklist and/or POF of the vehicle (as indicated by a user input or by another system of the vehicle). Specifically, the POF variable may correspond to each of the above discussed POF names, the above discussed checklist names, or to some or all of the checklists of the electronic checklist. The POF variable may be used to determine the current phase of flight for the aircraft. This may overcome problems with determining POF flight based on, e.g., flight path or aircraft dynamics in flight or during ground operations.

The window configuration function may define which window configurations (of all pre-define window configurations) are displayed for the first window configuration 305A and the second window configuration 305B, based on the POF variable. For instance, if the POF variable indicates the current POF is takeoff, then the first window configuration 305A may correspond to a takeoff window configuration and the second window configuration 305B may correspond to a taxi window configuration (as the taxi POF preceded the takeoff POF).

The pre-defined window configurations may be set by the OEM or may be configurable so that an aircraft organization (e.g., airline) may set the pre-defined window configurations. The association between the POF variable and which window configurations (of all pre-define window configurations) are displayed for the first window configuration 305A and the second window configuration 305B may be set by the OEM or may be configurable so that the aircraft organization may set the association.

An example reconfiguration process may include: when/in response to the first user input in a region associated with an underline bar 210 (e.g., any checklist title 205 of the checklists of the electronic checklist, such as in FIG. 2), the touch screen may receive the first user input, and transmit a first input message to the processor indicating the first user input and the underline bar 210 region. The processor may, in response to the first user input and the region, cause a menu to be displayed that includes one or more window configuration options (see, e.g., FIG. 3). The processor may determine which window configuration options to display based on a stored POF variable and a window configuration function.

The user may input a second user input to the touch screen. The touch screen may receive the second user input, and transmit a second input message to the processor indicating the second user input and a region associated with one of the one or more window configuration options. The processor may, in response to the second user input and the region associated with one of the one or more window configuration options, determine which one of the one of the one or more window configuration options was selected. The processor may, based on the selected window configuration option, configure the front displays 28 or the control touch screen display 36 in accordance with a window configuration corresponding to the selected window configuration option. The processor may then close the menu. For instance, the processor may change the configured state in accordance with the window configuration corresponding to the selected window configuration option.

Moreover, the first window configuration option of the window configuration options may be auto-selected in response to the display of the menu. The processor may cause the first window configuration option to be highlighted in a different color from the other options (so that the user may be made aware of the auto-selection). The user may select the auto-selection without touch interacting with the touch screen by (1) waiting a predefined period of time (e.g., more than five seconds) or (2) by pressing a button (e.g., enter button on a keyboard, a mouse click on a mouse, or an enter or press on Cursor Control Device (CCD)).

Figure 4:
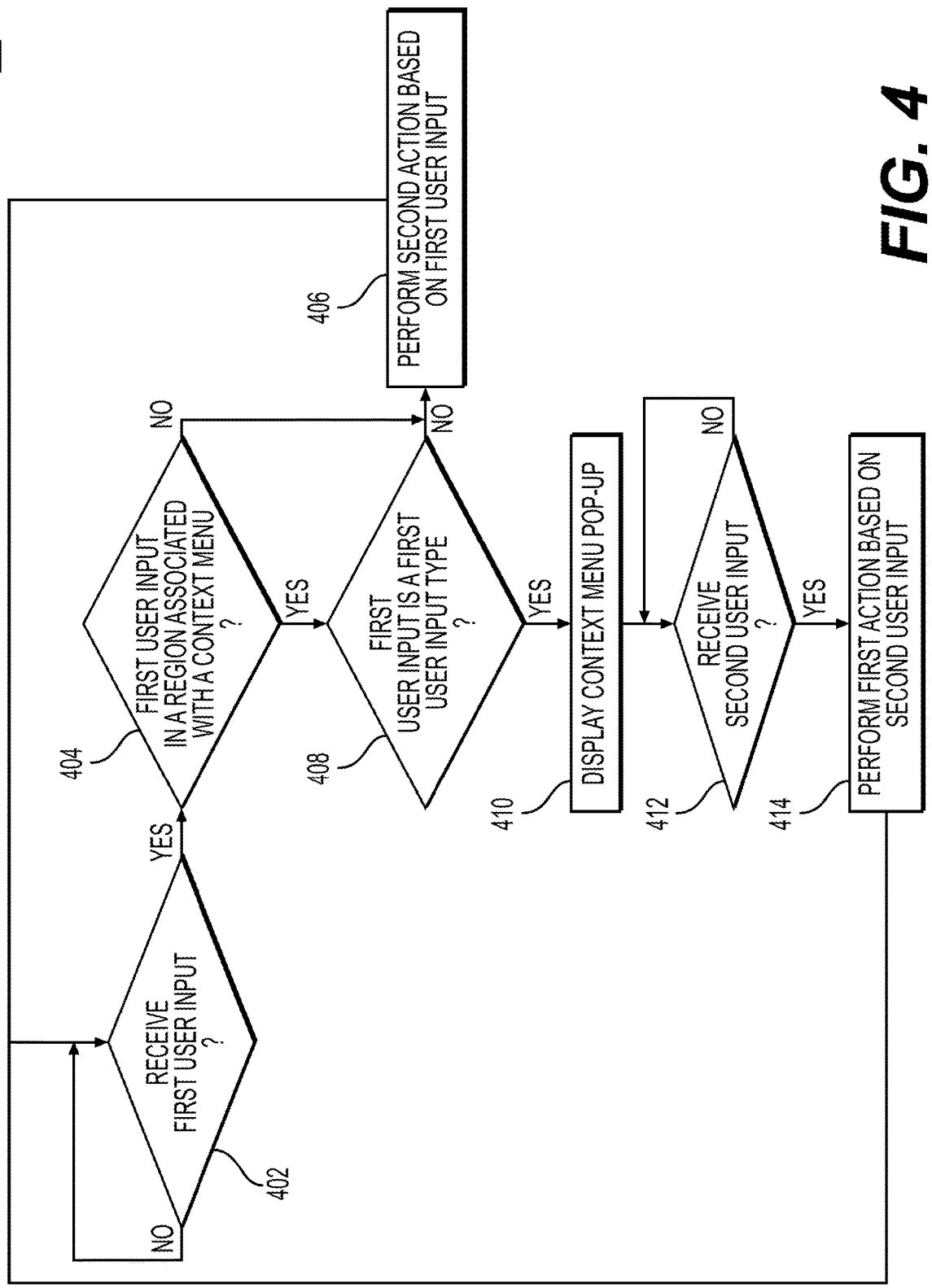
FIG. 4 depicts a flow chart of an exemplary method for managing configurations of multiple vehicle displays, according to one or more embodiments.

FIG. 4 depicts a flow chart for managing configurations of multiple displays, according to one or more embodiments. The flowchart 400 may depict a method. The method may include, by a system with a processor, memory, and touch screen: determine whether the touch screen has received a first user input (block 402). If no first user input is received, the method may continue to wait until the first user input is received (block 402: No).

If a first user input is received (block 402: Yes), the method may proceed to determine whether the first user input is in a region associated with a context menu (block 404). If not (block 404: No), the method may proceed to perform a second action based on the first user input (block 406). Then, the method may proceed to wait for a first user input again (block 402).

If the first user input is in the region associated with the context menu (block 404: Yes), the method may proceed to determine whether the first user input is a first user input type (block 408).

If not (block 408: No), the method may proceed to perform a second action based on the first user input (block 406). Then, the method may proceed to wait for a first user input again (block 402).

If the first user input was a first user input type (block 408: Yes), the method may proceed to display menu (block 410). The menu may correspond to a checklist title 204, discussed above. The menu may display one or more window configuration options.

The method may proceed to determine whether a second user input is received (block 412). If not (block 412: No), the method may proceed to wait until the second user input is received.

If the second user input is received (block 412: Yes), the method may proceed to perform a first action based on the second user input (block 414). Then, the method may proceed to wait for a first user input again (block 402).

The first action may include: (1) based on the touch screen receiving the second user input and transmitting a second input message to the processor indicating the second user input and a region associated with one of the one or more window configuration options, determine which one of the one of the one or more window configuration options was selected; (2) based on the selected window configuration option, configure the front displays 28 or the control touch screen display 36 in accordance with a window configuration corresponding to the selected window configuration option; and (3) close the menu.

The second action may be some other interaction with the checklist of the electronic checklist (e.g., inputs to the one or more checklist items 215).

In another aspect of the disclosure, the checklist control program may display an underline bar 210 in association with an icon. In response to the first user input on a region associated with the underline bar 210, a menu like the menu 305 discussed above may be displayed. The icon may not be the checklist title 205, but instead an icon that links to one or more different window configuration options, like the first window configuration 305A, the second window configuration 305B, and/or the third window configuration 305C, discussed above. In this manner, the checklist control program may provide quick access to re-configure the windows, even when not directly interacting with a checklist that has a checklist title 205 that has an underline bar 210.

In another aspect of the disclosure, the checklist control program may display an underline bar 210 in association with an icon. In response to the first user input on a region associated with the underline bar 210, the processor may perform a speech-to-action function. Specifically, the processor may enable a microphone to receive audio. The microphone may receive the audio, convert the audio into analog or digital signals, and transmit the analog or digital signals to the system. The processor may receive the analog or digital signals, process the signals using speech-to-text software, and determine a speech command of the audio. The processor may perform an action corresponding to the speech command of the audio. Specifically, the processor may interpret the speech command of the audio to configure the front displays 28 or the control touch screen display 36 based on the speech command naming one of the POF names or the checklist names, as listed out above. For instance, the user may say "configure the display units for takeoff," and the processor may (1) process the audio to determine that the front displays 28 or the control touch screen display 36 are to be configured for takeoff, and (2) configure the front displays 28 or the control touch screen display 36 based on a takeoff window configuration stored in the window configuration file and/or the window configuration rules.

Figure 5:
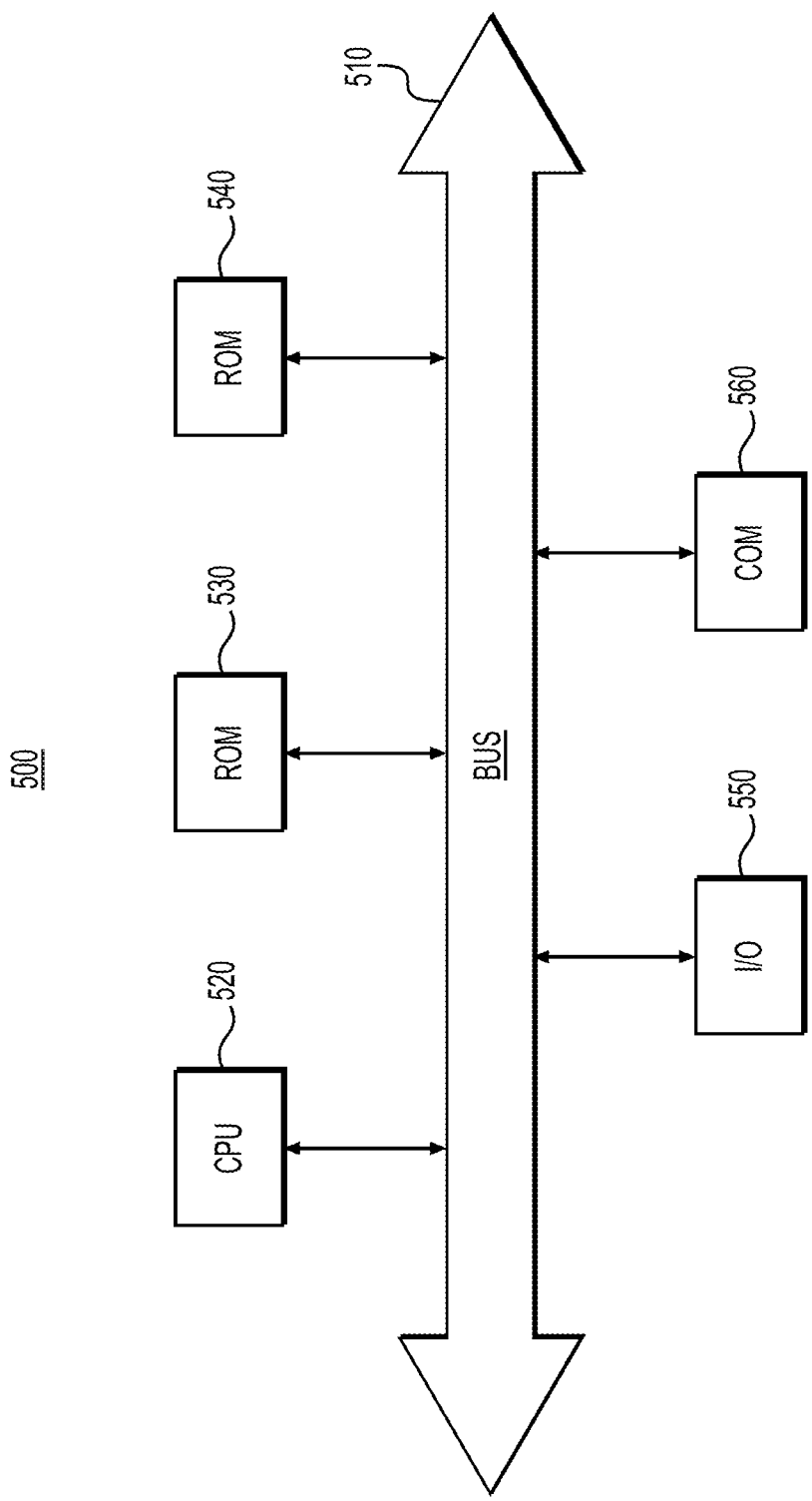
FIG. 5 depicts an example system that may execute techniques presented herein.

FIG. 5 depicts an example system that may execute techniques presented herein. FIG. 5 is a simplified functional block diagram of a computer that may be configured to execute techniques described herein, according to exemplary embodiments of the present disclosure. Specifically, the computer (or "platform" as it may not be a single physical computer infrastructure) may include a data communication interface 560 for packet data communication. The platform may also include a central processing unit ("CPU") 520, in the form of one or more processors, for executing program instructions. The platform may include an internal communication bus 510, and the platform may also include a program storage and/or a data storage for various data files to be processed and/or communicated by the platform such as ROM 530 and RAM 540, although the system 500 may receive programming and data via network communications. The system 500 also may include input and output ports 550 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for managing configurations of multiple vehicle displays, comprising:
    obtaining a configurable file for an electronic checklist;
    generating a graphical user interface (GUI) based on the configurable file, wherein the GUI includes a plurality of tasks of the electronic checklist and at least one graphical element associated with a context menu indicator;
    displaying the GUI on one of the multiple vehicle displays;
    receiving a user input on the GUI, the user input being a first user input type or a second user input type, wherein the first user input type and the second user input type are one of: a short touch, a long touch, a tap, a swipe in a direction, or a multi-finger input;
    determining that an input region of the user input is in a region associated with the at least one graphical element;
    in response to determining the input region of the user input is in the region associated with the at least one graphical element, determining that the user input is the first user input type and not the second user input type;
    in response to determining the user input is the first user input type and not the second user input type, performing a window configuration setting process to configure the multiple vehicle displays based on the user input and the at least one graphical element;
    generating a plurality of configuration window options based on a window configuration function, a POF variable, and a most recent phase of flight or a next phase of flight as indicated by the POF variable; and
    transmitting a signal to display a context menu including the plurality of configuration window options.

2. The method of claim 1, wherein the performing the window configuration setting process based on the user input and the at least one graphical element further includes:
    and displaying the context menu on the GUI.

3. The method of claim 1, further comprising:
    receiving a second user input;
    determining whether a second input region of the second user input is in a region associated with one of the plurality of window configuration options; and
    in response determining the second input region of the second user input is in the region associated with one of the plurality of window configuration options, configuring the multiple vehicle displays in accordance with the one of the plurality of window configuration options.

4. The method of claim 1, wherein a window configuration option of the plurality of window configuration options corresponds to a present checklist of the electronic checklist or current phase of flight as indicated by the POF variable.

5. The method of claim 1, wherein:
    the short touch is a user touch on the display that is maintained for less than one second;
    the long touch is a user touch on the display that is maintained for more than two seconds;
    the tap is a user touch on the display that is maintained for less than a predetermined minimum period of time;
    the swipe is a user touch on the display that remains in contact with display from a starting position to an ending position, wherein a distance between the starting position and the ending position exceeds a predetermined threshold distance; and
    the multi-finger input comprises two or more discernable user touch points on the display.

6. The method of claim 1, wherein the region is a checklist title associated with the electronic checklist.

7. The method of claim 1, wherein performing the window configuration setting process to configure the multiple vehicle displays is further based on a speech-command, wherein the speech-command is obtained by:
    enabling a microphone to receive audio;
    receiving audio from a user;
    converting the audio into analog or digital signals;

processing the analog or digital signals using speech-to-text software; and determining the speech command based on the processing of the analog or digital signals by speech-to-text software.

8. A non-transitory computer-readable medium storing instructions that, when executed by a processor, cause the processor to perform a method for managing configurations of multiple vehicle displays, the method comprising:

obtaining a configurable file for an electronic checklist;

generating a graphical user interface (GUI) based on the configurable file, wherein the GUI includes a plurality of tasks of the electronic checklist and at least one graphical element associated with a context menu indicator;

displaying the GUI on one of the multiple vehicle displays;

receiving a user input on the GUI, the user input being a first user input type or a second user input type, wherein the first user input type and the second user input type are one of: a short touch, a long touch, a tap, a swipe in a direction, or a multi-finger input;

determining that an input region of the user input is in a region associated with the at least one graphical element;

in response to determining the input region of the user input is in the region associated with the at least one graphical element, determining that the user input is the first user input type and not the second user input type;

in response to determining the user input is the first user input type and not the second user input type, performing a window configuration setting process to configure the multiple vehicle displays based on the user input and the at least one graphical element;

generating a plurality of configuration window options based on a window configuration function, a POF variable, and a most recent phase of flight or a next phase of flight as indicated by the POF variable; and transmitting a signal to display a context menu including the plurality of configuration window options.

9. The non-transitory computer-readable medium of claim 8, wherein the performing the window configuration setting process based on the user input and the at least one graphical element further includes:

obtaining a window configuration function and a phase of flight (POF) variable; and displaying the context menu on the GUI.

10. The non-transitory computer-readable medium of claim 8, wherein the method further comprises:

receiving a second user input;

determining whether a second input region of the second user input is in a region associated with one of the plurality of window configuration options; and in response determining the second input region of the second user input is in the region associated with one of the plurality of window configuration options, configuring the multiple vehicle displays in accordance with the one of the plurality of window configuration options.

11. The non-transitory computer-readable medium of claim 8, wherein a window configuration option of the plurality of window configuration options corresponds to a present checklist of the electronic checklist or current phase of flight as indicated by the POF variable.

12. The non-transitory computer-readable medium of claim 8, wherein:

the short touch is a user touch on the display that is maintained for less than one second;

the long touch is a user touch on the display that is maintained for more than two seconds;

the tap is a user touch on the display that is maintained for less than a predetermined minimum period of time;

the swipe is a user touch on the display that remains in contact with display from a starting position to an ending position, wherein a distance between the starting position and the ending position exceeds a predetermined threshold distance; and the multi-finger input comprises two or more discernable user touch points on the display; and the region is a checklist title associated with the electronic checklist.

13. The non-transitory computer-readable medium of claim 8, wherein performing the window configuration setting process to configure the multiple vehicle displays is further based on a speech-command, wherein the speech-command is obtained by:

enabling a microphone to receive audio;

receiving audio from a user;

converting the audio into analog or digital signals;

processing the analog or digital signals using speech-to-text software; and determining the speech command based on the processing of the analog or digital signals by speech-to-text software.

14. A system for managing configurations of multiple vehicle displays, the system comprising:

a memory storing instructions; and a processor executing the instructions to perform a process including:

obtaining a configurable file for an electronic checklist;

generating a graphical user interface (GUI) based on the configurable file, wherein the GUI includes a plurality of tasks of the electronic checklist and at least one graphical element associated with a context menu indicator;

displaying the GUI on one of the multiple vehicle displays;

receiving a user input on the GUI, the user input being a first user input type or a second user input type, wherein the first user input type and the second user input type are one of: a short touch, a long touch, a tap, a swipe in a direction, or a multi-finger input;

determining that an input region of the user input is in a region associated with the at least one graphical element;

in response to determining the input region of the user input is in the region associated with the at least one graphical element, determining that the user input is the first user input type and not the second user input type;

in response to determining the user input is the first user input type and not the second user input type, performing a window configuration setting process to configure the multiple vehicle displays based on the user input and the at least one graphical element;

generating a plurality of configuration window options based on a window configuration function, a POF variable, and a most recent phase of flight or a next phase of flight as indicated by the POF variable; and transmitting a signal to display a context menu including the plurality of configuration window options.

15. The system of claim 14, wherein the performing the window configuration setting process based on the user input and the at least one graphical element further includes:
obtaining a window configuration function and a phase of flight (POF) variable;
and
displaying the context menu on the GUI.

16. The system of claim 14, the process further includes:
receiving a second user input;
determining whether a second input region of the second user input is in a region associated with one of the plurality of window configuration options; and
in response determining the second input region of the second user input is in the region associated with one of the plurality of window configuration options, configuring the multiple vehicle displays in accordance with the one of the plurality of window configuration options.

17. The system of claim 14, wherein a first window configuration option of the plurality of window configuration options corresponds to a present checklist of the electronic checklist or current phase of flight as indicated by the POF variable, and
a second window configuration option of the plurality of window configuration options corresponds to either:
a most recent checklist of the electronic checklist or a most recent phase of flight as indicated by the POF variable, or
a next checklist of the electronic checklist or a next phase of flight as indicated by the POF variable.

18. The system of claim 14, wherein:
the short touch is a user touch on the display that is maintained for less than one second;
the long touch is a user touch on the display that is maintained for more than two seconds;
the tap is a user touch on the display that is maintained for less than a predetermined minimum period of time;
the swipe is a user touch on the display that remains in contact with display from a starting position to an ending position, wherein a distance between the starting position and the ending position exceeds a predetermined threshold distance; and
the multi-finger input comprises two or more discernable user touch points on the display.

19. The system of claim 14, wherein the region is a checklist title associated with the electronic checklist.

20. The system of claim 14, wherein performing the window configuration setting process to configure the multiple vehicle displays is further based on a speech-command, wherein the speech-command is obtained by:
enabling a microphone to receive audio;
receiving audio from a user;
converting the audio into analog or digital signals;
processing the analog or digital signals using speech-to-text software; and
determining the speech command based on the processing of the analog or digital signals by speech-to-text software.

* * * * *